United States Patent

[11] 3,578,755

| [72] | Inventors | Bobby G. Bynum;<br>Drayton H. Talley, Huntsville, Ala. |
|---|---|---|
| [21] | Appl. No. | 845,991 |
| [22] | Filed | July 30, 1969 |
| [45] | Patented | May 18, 1971 |
| [73] | Assignee | The United States of America, as represented by the Administrator of the National Aeronautics and Space Administration |

[54] RESPONSE ANALYZER FOR SENSORS
7 Claims, 3 Drawing Figs.

[52] U.S. Cl. ................................................. 73/1R, 73/304C
[51] Int. Cl. .................................................. G01f 25/00
[50] Field of Search ........................................ 73/1 (R), 84, 299, 304 (C)

[56] References Cited
UNITED STATES PATENTS

| 2,833,144 | 5/1958 | Miller et al. ................. | 73/84 |
| 3,183,599 | 5/1965 | Byrd et al. ................... | 73/1(A)X |
| 3,381,516 | 5/1968 | Maples ........................ | 73/1(A) |

*Primary Examiner*—Louis R. Prince
*Assistant Examiner*—Joseph W. Roskos
*Attorneys*—L. D. Wofford, Jr., C. C. Wells and G. T. McCoy ABSTRACT: The invention is an apparatus for measuring the performance of liquid level sensors under dynamic conditions. The apparatus includes a motor driven cam having a cam groove formed therein. A cam follower riding in the cam groove drives a pivotally mounted lift rod which in turn drives a slide rod to which a sensor being tested is attached. The slide rod is positioned with respect to a container such that the attached sensor is moved in and out of a liquid in the container. A first signal generating means is provided that indicates when the sensor actually first enters the liquid and another signal is generated by the sensor when it senses entering the liquid. By monitoring the time lapse between the signals it is possible to determine the response characteristics of the sensor upon entry into a liquid. A camera and light source are utilized to photograph conditions within the container during test of a sensor.

PATENTED MAY 18 1971  3,578,755
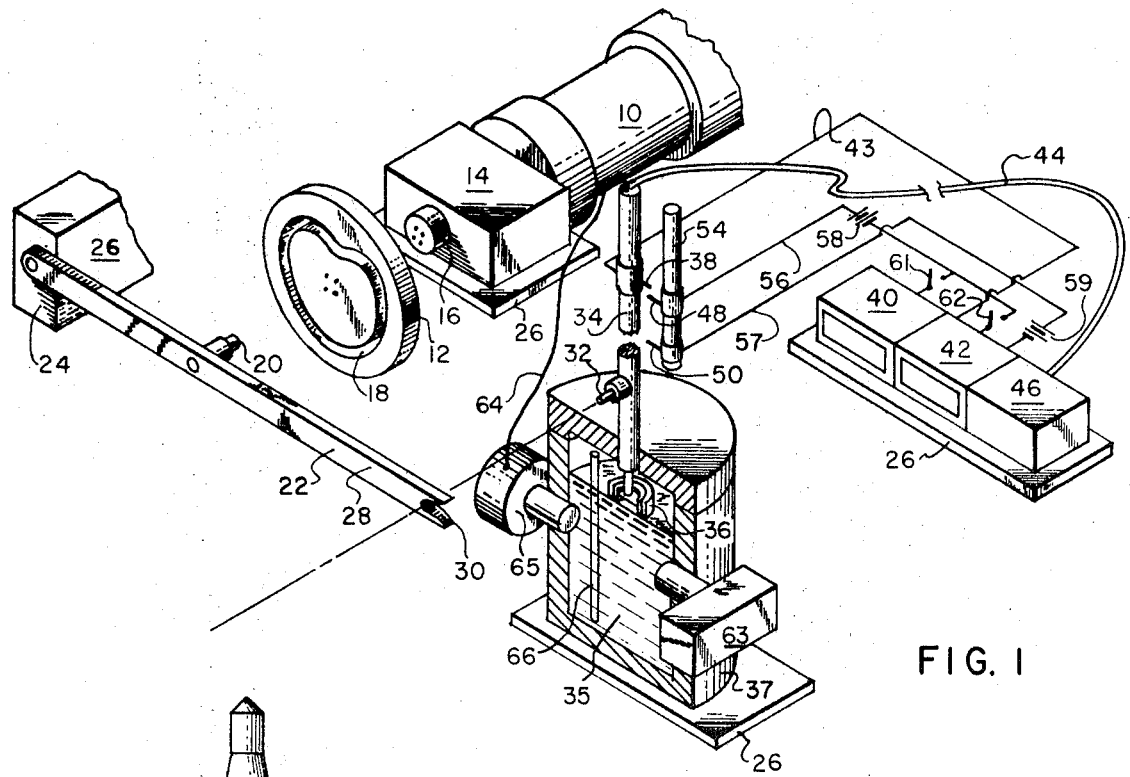
FIG. 1
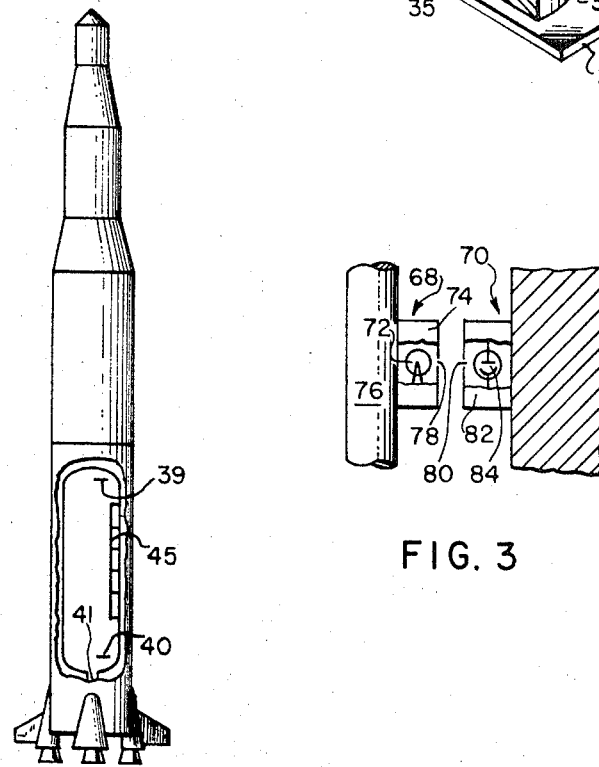
FIG. 3
FIG. 2
BOBBY G. BYNUM
DRAYTON H. TALLEY
INVENTORS
BY [signature]
Charles C. Wells
ATTORNEYS

RESPONSE ANALYZER FOR SENSORS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The development of rockets and missiles using liquid propellants, particularly those launch vehicles used in the exploration of space, have produced a large demand for very accurate liquid level sensors. There are various types of liquid level sensors; one common one being a capacitance type wherein the sensor capacitance will vary when the sensing element is in a liquid, vapor or gas.

Sensors for use in rockets must perform to very strict performance standards because sensor inaccuracies can result in propellant loading errors, erroneous engine cutoff, or erroneous propellant behavior data. For example, the operation of a liquid rocket engine requires the pumping of liquid propellants from a tank to the combustion chamber of the rocket engine. A turbopump is commonly used for such pumping and the pump will run away and possibly destroy itself if permitted to run dry. To prevent this a liquid level sensor can be positioned near the fuel tank outlet that feeds such a pump. The sensor would generate a signal to shut the pump down when left exposed by a change in the liquid propellant level.

The requirement for not letting the pumps run dry must be balanced against the need for utilizing as much of the propellant in the tank as possible so as to minimize propellant weight increases due to surplus propellants that provide a more than adequate safety margin against running the pump dry. In the past there has been no method or apparatus available for accurately determining the performance characteristics of liquid level sensors under dynamic conditions and maximum propellant usage could not be accomplished safely.

Performance characteristics of sensors include such things as response time, resolution and repeatability. Response time can be defined as the time required for the sensor and associated circuitry to indicate the passing of a liquid/vapor interface. Ideally the indication from the sensor would coincide with the actual happening, but this doesn't occur for various reasons. One reason being that liquid tends to cling to the sensor after removal of the liquid from the sensor or vice versa. Response time of a sensor is usually specified with the liquid/vapor interface traveling at a given speed. Resolution is defined as the smallest dimension of measurement that can be measured or detected by the sensor. Repeatability is the range in which all sensor data for a particular liquid/vapor interface condition will fall.

Liquid level sensors are used in liquid propellant rockets to determine when the tanks are full of propellant and to monitor slosh characteristics of a tank. Propellant tanks for space vehicles are quite thin and fabricated to close design tolerances so as to save weight. Excessive sloshing of the propellant within the tank can result in stresses of sufficient magnitude to cause a rupture of the tank wall. Thus, it is important to monitor slosh and a capacitance type liquid level sensor can be used for this purpose.

SUMMARY OF THE INVENTION

The invention is an apparatus for measuring the performance characteristics of liquid level sensors. The apparatus includes a motor driven cam means linked to a reciprocating slide rod for moving a sensor under test in and out of a liquid. The cam means includes a rotating cam disc having a cam groove formed therein that is designed to impart a desired motion to the sensor. Cam motion is transferred by a cam follower mounted on the slide rod that rides in the cam groove so as to drive the slide rod. Electrical contact means are mounted on the slide rod so as to engage fixed electrical contacts mounted adjacent the slide rod when the rod is moved to a position wherein the sensor being tested enters or leaves the liquid. A suitable timing meter like an Events Per Unit Time (EPUT) meter is connected to the contacts on the slide rod. Closing of the contacts actuates the meter at the time the sensor actually enters the liquid. The sensor itself and associated electronics is electrically connected to the meter for connecting the output of the sensor into the meter when the meter has sensed entry into the liquid. Thus it is possible to measure the response time of the sensor; i.e., how long it takes the sensor to sense entrance into the liquid. Similar measurements could be made to determine the response time of the sensor coming out of the liquid. Also the performance of a sensor in continuous cyclic motion in and out of a liquid can be monitored. A camera is mounted on the container along with a suitable light source for filming the sensor as it travels within the container of liquid.

BRIEF DESCRIPTION OF THE DRAWINGS

FIG. 1 is a schematic illustration of the invention.

FIG. 2 shows a typical placement of liquid level sensors in the fuel tank of a launch vehicle.

FIG. 3 illustrates an optical switch means that could be utilized as a replacement for the mechanical switching means employed in the invention as shown in FIG. 1.

DETAILED DESCRIPTION OF THE INVENTION

Referring now to FIG. 1 of the drawing where the invention is schematically illustrated. An electric motor 10 driving cam 12 through a variable speed gear reduction mechanism 14 makes up a motorized drive. Cam 12 is bolted to output shaft 16 of the mechanism 14 and rotates therewith. A cam groove 18 of a suitable design is cut into the cam. A cam follower 20 is mounted approximately midways on a lift rod 22 that has one end 24 pivotally mounted to a supporting framework 26. The details of the supporting framework for the various components of the apparatus has not been shown herein for simplicity of illustration, but it should be apparent that such framework would be necessary and could take various forms.

End 28 of lift rod 22 has a slot 30 formed therein that engages a bearing or bushing 32 mounted on slide rod 34 so as to transfer angular motion of the lift rod due to cam rotation into vertical motion of the slide rod. This in turn results in motion of sensor 36, mounted on the lower end of the slide rod, into and out of a liquid 35 in insulated container 37.

Sensor 36 is shown as a capacitance type sensor, but it should be understood that any of several types of sensors suitable for use in detecting the presence or absence of a liquid could be tested. A capacitance type liquid sensor for example can be a concentric ring arrangement, as shown in FIG. 1, connected to appropriate electronic circuitry, such as a power supply and balanced bridge arrangement, that has been adjusted so that the sensor will have no voltage output while in air, but produce a voltage output when immersed in a liquid, or vice versa. FIG. 2 illustrates a typical placement of liquid level sensors in the propellant tank of a launch vehicle. Sensor 39 indicates when the tank is full and sensor 40 is utilized to signal when the propellant level drops to a point approaching outlet 41 of the tank. As mentioned above, it is necessary to avoid letting the pump that transfers propellant from the tank to the engine run dry. Sensor 40 accomplishes this. A continuous liquid level probe 45 made up of a plurality of spaced sensors mounted on a supporting framework can be used in a propellant tank to monitor propellant level in the tank.

Slide rod 34 has electrical contact 38 mounted thereon. This contact is moveable and connected to events per unit time meters (EPUT meters) 40 and 42 via electrical lead 43. EPUT meters are commercially available timing devices that are started and stopped by electrical pulses and display elapsed time with a digital readout. The sensor is connected through cable 44 to appropriate circuitry, such as a power supply and balanced bridge indicated in block form at 46, and to the EPUT meters. The leads to the EPUT meters are not shown. Electrical contacts 48 and 50 are mounted on a fixed member 54 which is part of the supporting framework. Contact 38 along with contacts 48 and 50 form a switch that is actuated by vertical movement of the slide rod. These two contacts are electrically connected to the EPUT meters via electrical leads 56 and 57. Voltage sources 58 and 59 are connected in lead lines 56 and 57, respectively, so as to provide a pulse voltage to the EPUT meters for starting and/or stopping of the meters when the bladelike contact element of contact 38 engages the bladelike contact elements of contacts 48 and 50. Switches 61 and 62 are connected between lead line 56 and EPUT meters 40 and 42 so that either one or both of the meters can receive a pulse when contact 38 engages contact 48. A camera 63 is mounted on container 37 in a manner to permit photographing the interior of the container. A strobe light 65 or other suitable light source is mounted on the container and arranged so as to illuminate the interior thereof when triggered by a signal from either the electrical contacts or sensor via electrical lead 64. Lead 64 is shown connected into cable 44 and thus to the sensor, but it could as well be connected so as to receive an output from contacts 48 or 50. A scale or gauging rod 66 is positioned within tank 37 in the field of view of camera 63.

The operation of the device is simple and it would be apparent to one skilled in the art that various hookups could be made to measure various sensor characteristics. However the cycle of operation described hereafter is that required to determine how long it takes a sensor to indicate being immersed and/or withdrawn from a liquid.

As mentioned above, cam 12 is rotated by motor 10 and this motion is transferred through a suitable mechanism to impart a vertical movement to a slide rod 34 and thereby cycle sensor 36 in and out of liquid 35. Assuming the sensor and slide rod are at the top of their movement just before starting downward, the electrical contacts will be disengaged. As the slide rod descends movable contact 38 engages contact 48 to complete a circuit that generates a voltage pulse signal to start EPUT meter 40. Contact 38 is positioned along the slide rod so as to just engage contact 48 when the sensor enters the liquid in the insulated container. A signal produced by the sensor as soon as it responds to liquid entry stops EPUT meter 40 and thus sensor response time can be read directly from the EPUT meter 40.

Generally it is desired to determine what the sensor response time is at a particular sensor velocity. Sensor velocity can be varied by adjusting the speed of the motorized drive and the exact sensor velocity can be measured or verified by use of a timing meter. Sensor velocity can be measured with EPUT meter 42 by having the meter connected so that it is turned on by contact between contacts 38 and 48 and turned off when the slide rod has travelled downwardly to a point where contact 38 will engage contact 50. The distance between contacts 48 and 50 is known and the time required for contact 38 to travel the distance between the two contacts is recorded by EPUT meter 42. Thus it is possible to determine the velocity of the slide rod and sensor.

Another method which can be used for measuring the response time of a sensor is with the aid of camera 63. The camera is positioned as shown in FIG. 1 such that it can photograph the liquid vapor interface, the sensor as it enters the liquid, and scale 66. The container of liquid is closed to prevent ambient light from entering the camera. The camera shutter is opened and the motorized drive is actuated. The output signal from the sensor is connected into strobe light 65 so that the light is flashed when the sensor signals entry into the liquid or liquid/vapor interface. The camera of course will record what it sees during this flash of light and the photograph taken will illustrate the location of the sensor relative to the liquid/vapor interface. The velocity of the sensor is known, or measured by EPUT meter 42 in the manner discussed above, and the distance the sensor is away from the liquid/vapor interface can be obtained from the scale in the photograph. Perhaps it should be mentioned here that the photographs can be taken when the sensor is either entering or leaving the liquid. If taken when entering the liquid the response time of the sensor will be such that the sensor will have travelled some distance into the liquid when the strobe light is triggered and the photograph is taken. Just how far the sensor will have travelled into the liquid of course depends upon the response time thereof. If the photograph is taken leaving the liquid then the sensor will be some distance above the liquid/vapor interface.

An advantage of the photographic method of determining response time is that it provides a permanent record of the test. The photographs also show liquid flow characteristics around the sensor and thereby provide information as to how sensor construction affects response time.

This completes the detailed description of the structure and operation of one embodiment. There are minor changes however which could be made. For example the mechanical contact switches shown schematically in FIG. 1 as 38, 48 and 50 could be replaced by an optical switch like that shown in FIG. 3. The switch includes a light source 68 and light detector 70. In this embodiment light source 68 would include a lamp 72 positioned within an enclosure 74 mounted on a slide rod 76. Slide rod 76 would be identical in function to slide rod 34. Light or radiation would leave enclosure 74 through aperture 78 formed therein. When light source 68 and detector 70 are aligned, radiation from the light source enters aperture 80 formed in enclosure 82 and illuminates photocell 84 mounted therein. The photocell generates a signal when illuminated. Enclosure 82 is mounted on an appropriate part of the supporting framework.

We claim:

1. A response analyzing apparatus for liquid-vapor interface sensors comprising:
   a supporting framework;
   a motorized drive mounted on said framework;
   a cam having a cam groove cut therein, said cam being mounted on said motorized drive for rotation thereby;
   a lift rod pivotally mounted at one end to the supporting framework, said lift rod having a cam follower mounted thereon that rides in the cam groove so as to impart angular motion to said lift rod when said cam is rotated;
   a slide rod pivotally connected to said lift rod at the end thereof opposite said one end pivotally connected to the framework whereby angular motion of said lift rod will cause vertical motion of said slide rod, said slide rod being adapted to have a sensor mounted on one end thereof;
   a liquid container positioned below said slide rod such that a sensor mounted on the end of said slide rod will move in and out of a liquid in said container;
   timing means mounted on the framework;
   switch means mounted on said slide rod and framework and connected to said timing means so as to deliver a signal that starts the timing means when the slide rod has moved to a position that would immerse a sensor being tested in a liquid in the container;
   means adapted for connection to a sensor under test so that the sensor being tested can deliver a signal to the timing means that stops said timing means when the sensor has sensed immersion in a liquid, whereby a measurement is made as to the response time of a sensor being tested.

2. The apparatus recited in claim 1 wherein said timing means are events per unit time meters that are started and stopped by voltage pulses and display elapsed time with a digital readout.

3. The apparatus recited in claim 2 which further includes photographic means mounted on said container for photographing the sensor's movement in the container.

4. The apparatus recited in claim 3 wherein said switch means includes an electrical switch element mounted on said slide rod; and
   a plurality of electrical switch elements mounted on said framework in a position to be actuated by the electrical switch element on said slide rod when said slide rod is moved vertically.

5. The apparatus recited in claim 4 wherein said electrical switch elements are mechanical contacts that are brought into contact by vertical movement of said slide rod.

6. The apparatus recited in claim 4 wherein:
said electrical switch element mounted on said slide rod is a light source; and
said plurality of switch elements mounted on said framework are light detectors that include photocells that generate electrical signals upon being illuminated by the light source on said slide rod as it moves in a vertical direction.

7. The apparatus recited in claim 3 wherein said photographic means includes:
a camera mounted on said liquid container in a position to photograph the interior of said container; and
a strobe light mounted on said container for illuminating the interior thereof, said strobe light being electrically connected to the sensor under test so as to be triggered by a signal therefrom.